May 4, 1954
A. A. WENTZEL
2,677,445
ACCELERATOR CONTROL
Filed Dec. 21, 1949
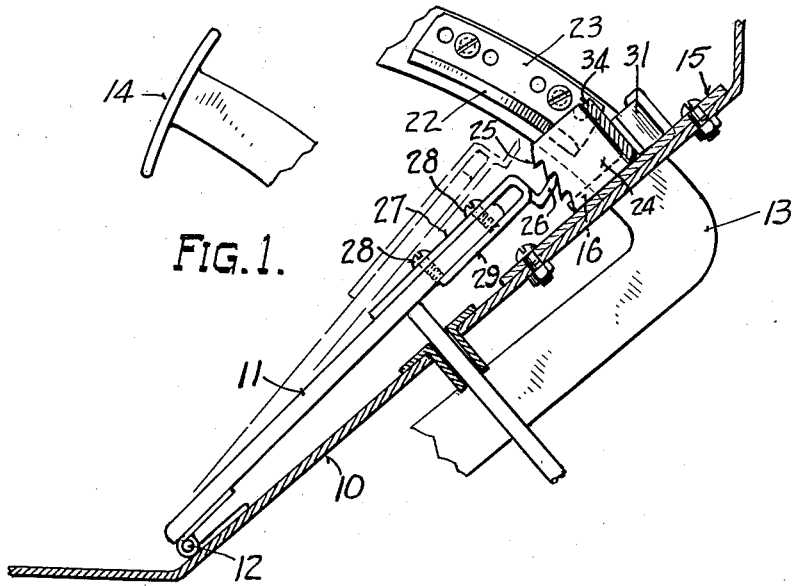
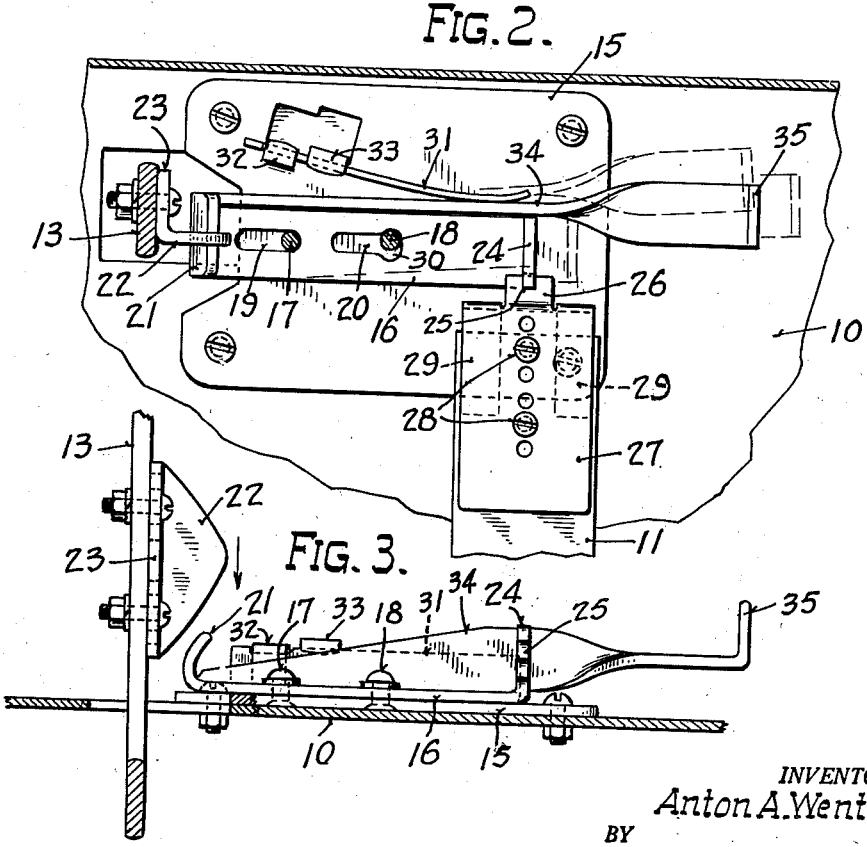
INVENTOR.
Anton A. Wentzel
BY
ATTORNEY.

Patented May 4, 1954

2,677,445

UNITED STATES PATENT OFFICE 2,677,445

ACCELERATOR CONTROL

Anton A. Wentzel, Milwaukee, Wis.; Howard H. Wentzel, administrator of said Anton A. Wentzel, deceased Application December 21, 1949, Serial No. 134,208

4 Claims. (Cl. 192—3)

This invention relates to accelerator controls for motor vehicles.

The necessity of maintaining a substantial and usually continuous foot pressure on the accelerator of modern motor vehicles sometimes for long periods of time is a common cause of serious driving fatigue. This is true in spite of the many forms of devices heretofore proposed for alleviating this difficulty, none of which have proven entirely satisfactory and none of which are in general use.

A device satisfactory for this purpose must be automatically effective to retain an accelerator in any of various positions into which the latter may be adjusted and reliably operable to automatically release the latter whenever the brakes are applied, it must be capable of being rendered effective or ineffective at the will of the driver, and it should be of a simple inexpensive construction capable of universal application and ready installation without material modification of those controls with which it is combined.

One object of the present invention is to provide a new and improved accelerator control possessing the above noted functional and structural requirements.

Other more specific objects and advantages will appear, expressed or implied, from the following description of an illustrative embodiment of this invention.

In the accompanying drawings:

Figure 1 is a view in side elevation of an accelerator control mechanism constructed in accordance with the present invention and shown applied to a conventional motor vehicle.

Fig. 2 is a top plan view.

Fig. 3 is a view in front elevation.

The accelerator control mechanism selected for illustration is shown applied to the floor board 10 of a motor vehicle equipped with a conventional accelerator pedal 11 hingedly mounted at 12 thereon. A conventional brake lever is shown at 13 extending through the floor board and provided with the customary actuating pedal 14.

In this instance the control mechanism shown includes a mounting plate 15 for attachment to the floor board and having a relatively narrow slide plate 16 seated thereon and extending from a point adjacent the brake lever 13 to a point adjacent the accelerator pedal 11. The slide plate 16 is retained on the mounting plate preferably by a pair of headed studs 17 and 18, the studs being respectively engaged in longitudinal guide slots 19 and 20 in the slide plate so as to permit free lengthwise movement thereof.

That end of the slide plate 16 adjacent the brake lever 13 is bent or otherwise fashioned to provide a cam 21 for coaction with a cam 22 on the brake lever. In this instance the cam 22 projects laterally from a base flange 23 bolted or otherwise adjustably fixed against the side of the lever 13.

That end of the slide plate 16 adjacent the accelerator pedal 11 is bent or otherwise fashioned to provide a ratchet member 24 having a toothed edge 25 for coaction with a pawl 26 carried by the accelerator pedal. In this instance the pawl 26 is shown as constituting an integral part of a bracket plate 27 seated on the top face of the accelerator pedal 11 at the free end thereof and adjustably fixed thereto by screws 28 or the like. The plate 27 is bent back upon itself so as to embrace the end of the pedal and is fashioned to provide two laterally spaced clamp ears 29 arranged to bear against the under side of the pedal. The pawl 26 is disposed between the ears 29 and projects toward the ratchet member 24.

In order to permit a characteristic ratchet action between the pawl 26 and member 24 provision is made for permitting a limited swinging movement of the slide plate 16 on the mounting plate 15. For this purpose one end 30 of the guide slot 20 is enlarged, so that when the slide plate is in the longitudinal position shown in Fig. 2 it is swingable about the axis of the stud 17 through an angle sufficient for the ratchet member 24 to clear the pawl 26. Appropriate means, such as a leaf spring 31, yieldably urges the slide plate 16 and ratchet member 24 toward the pawl 26. In this instance the spring 31 is held by suitable retainer lugs 32 and 33, struck up from the mounting plate 15, so that the free end of the spring bears against an upstanding edge flange 34 carried by the slide plate 16.

Provision is also made for shifting the ratchet member 24 into or out of coacting relation with the pawl 26 at the will of the driver. For this purpose the edge flange 34 is longitudinally extended well beyond the side of the accelerator pedal 11 and equipped with an upturned portion 35 conveniently disposed for manipulation by the toe of the driver. By virtue of this arrangement the portion 35 may be elevated into the upper broken line position of Fig. 2, so as to disengage the ratchet member 24 from the pawl 26 by a swinging action of the slide plate 16, thereby permitting the accelerator pedal to assume an upper idling position; or the accelerator pedal may be released by shifting the portion 35 toward the right into the other broken line position shown in Fig. 2, so as to move the slide plate 16 lengthwise and thereby shift the ratchet member 24 into a position laterally beyond the pawl 26. Since, in the position last described, the ratchet member 24 is laterally beyond the range of operation of the pawl 26, the accelerator pedal 11 is free to be manipulated in a normal manner, this being the position into which the slide plate 16 is set when it is desired to render the ratchet mechanism inactive or ineffective.

It will of course be understood that whenever it is desired to place the accelerator pedal under the control of the ratchet mechanism, this is accomplished by manipulating the portion 35 in a direction to return the slide plate 16 into the full line position of Fig. 2, so as to position the ratchet member 24 within the path of travel of the dog 26, in which position the member 24 will coact with dog 26 to retain the accelerator pedal 11 in any of a plurality of depressed positions into which it may be set during normal driving. It will be noted however that the mechanism described will function to automatically release the pedal 11 and permit it to return to idling position whenever the brake pedal 14 is depressed to apply the brakes. This automatic function is brought about by the action of the cam 22 which moves with the brake pedal and reacts on the cam 21 to shift the slide plate 16 to right into the inactive or ineffective position hereinabove described.

It will thus be noted that an accelerator control mechanism has been provided which is of simple economical design, which may be readily and universally applied to motor vehicles without necessitating material modification of other control parts, which may be relied upon to automatically retain an accelerator in any of a plurality of driving positions and readily operable to release the same at the will of the driver, and which may be easily adjusted to render the same effective or ineffective as the driver may elect.

Various changes may be made in the invention hereinabove specifically described without departing from or sacrificing the advantages of the invention as defined in the appended claims.

I claim:

1. In an accelerator control mechanism for motor vehicles the combination of a pawl adapted to be carried by the accelerator, a mounting plate for attachment to the floor of the vehicle, a slide plate mounted for lengthwise movement on said mounting plate, a ratchet carried by said slide plate and cooperable with said pawl to automatically retain said accelerator in any of a plurality of driving positions, said ratchet being movable with said slide plate into and out of cooperating relation with said pawl, said slide plate being swingable on said mounting plate to permit ratcheting action between said ratchet and pawl, means projecting from one end of said slide plate for effecting lengthwise or swinging movements thereof at the will of the driver, and means at the other end of said slide plate for moving the same lengthwise in response to brake pedal actuation.

2. In an accelerator control mechanism for motor vehicles the combination of a pawl member and a ratchet member cooperable to automatically retain the accelerator pedal in any of a plurality of operating positions, one of said members being mounted on the accelerator pedal, the other of said members being mounted on a bodily slidably element movable to shift said last named member into and out of coacting relationship with said other member, said bodily slidable element having a pressure receiving surface thereon disposed adjacent the brake pedal, and pressure transmitting means on the brake pedal engageable with said pressure receiving surface on said bodily slidable element upon depression of the brake pedal to effect bodily sliding movement of said element to disengage said members to release the accelerator from its retained position.

3. In an accelerator control mechanism for motor vehicles the combination of a pawl member and a ratchet member cooperable to automatically retain the accelerator pedal in any of a plurality of operating positions, one of said members being mounted on the accelerator pedal, the other of said members being mounted on a swingable bodily slidable element, said element being swingable to permit ratcheting action between said members and slidable to shift said last named member into and out of coacting relationship with said other member, manually operable means on said swingable bodily slidable element for selectively positioning said members in operative or inoperative relationship, and automatic means on said swingable bodily slidable element responsive to depression of the brake pedal to disengage said members to release the accelerator from its retained position.

4. In an accelerator control mechanism for motor vehicles the combination of a pawl member and a ratchet member cooperable to automatically retain the accelerator pedal in any of a plurality of operating positions, one of said members being mounted on the accelerator pedal, the other of said members being mounted on a swingable bodily slidable element, said element being swingable to permit ratcheting action between said members when they are in cooperating engagement, said element also being bodily slidable to shift said members out of cooperating engagement, manually operable means on said swingable bodily slidable element for selectively positioning said members in operative or inoperative relationship, and automatic means on said swingable bodily slidable element responsive to depression of the brake pedal to disengage said members to release the accelerator from its retained position, said automatic means comprising a pressure receiving surface on said movable element disposed adjacent the brake pedal and pressure transmitting means on the brake pedal engageable with said pressure receiving surface upon depression of the brake pedal to effect sliding movement of said element to disengage said members to release the accelerator from its retained position.

References Cited in the file of this patent

UNITED STATES PATENTS

| Number    | Name      | Date          |
|-----------|-----------|---------------|
| 1,436,154 | Dickerson | Nov. 21, 1922 |
| 1,569,612 | Burrows   | Jan. 12, 1926 |
| 1,662,211 | Shier     | Mar. 13, 1928 |
| 1,830,441 | Mulhollen | Nov. 3, 1931  |
| 1,864,881 | Abel      | June 28, 1932 |
| 2,033,821 | Ellery    | Mar. 10, 1936 |
| 2,076,460 | Heinrich  | Apr. 6, 1937  |
| 2,503,802 | Contcher  | Apr. 11, 1950 |